(12) United States Patent
Gong et al.

(10) Patent No.: US 11,150,797 B2
(45) Date of Patent: Oct. 19, 2021

(54) METHOD AND DEVICE FOR GESTURE CONTROL AND INTERACTION BASED ON TOUCH-SENSITIVE SURFACE TO DISPLAY

(71) Applicant: BEIJING LUCKEY TECHNOLOGY CO., LTD., Beijing (CN)

(72) Inventors: Huachao Gong, Beijing (CN); Xudong He, Beijing (CN)

(73) Assignee: BEIJING LUCKEY TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 15/892,406

(22) Filed: Feb. 8, 2018

(65) Prior Publication Data

US 2018/0173414 A1    Jun. 21, 2018

Related U.S. Application Data

(63) Continuation of application No. PCT/CN2017/088387, filed on Jun. 15, 2017.

(30) Foreign Application Priority Data

Jul. 25, 2016   (CN) .......................... 201610592695.6

(51) Int. Cl.
*G06F 3/0488* (2013.01)
*G06F 3/0484* (2013.01)
(Continued)

(52) U.S. Cl.
CPC ...... *G06F 3/04883* (2013.01); *G06F 3/03547* (2013.01); *G06F 3/0484* (2013.01);
(Continued)

(58) Field of Classification Search
CPC ....... G06F 2203/04803; G06F 3/03547; G06F 3/04817; G06F 3/0484; G06F 3/04845;
(Continued)

(56) References Cited

U.S. PATENT DOCUMENTS 6,061,061 A * 5/2000 Conrad ................. G06F 3/0481
715/781
2009/0262086 A1 * 10/2009 Chen .................... G06F 3/03547
345/173
(Continued)

FOREIGN PATENT DOCUMENTS

CN        104166553 A      11/2014
CN        104850264 A       8/2015
(Continued)

OTHER PUBLICATIONS

First Office Action in counterpart Japanese Application 2018-502410, dated Sep. 3, 2019.
(Continued)

*Primary Examiner* — Jennifer N Welch
*Assistant Examiner* — Reji Kartholy
(74) *Attorney, Agent, or Firm* — Westbridge IP LLC

(57) ABSTRACT

The present disclosure discloses a gesture control and interaction technology based on "touch-sensitive surface to display". A novel interaction method is proposed by combining the touch-sensitive surface technology with display technology. Firstly, a certain gesture is made on a touch-sensitive surface to activate a certain window of the display; the sliding of the finger on the touch-sensitive surface is synchronized in GUI of the display window by the sliding operation of the finger on the touch-sensitive surface, the finger being raised, corresponds to some kind of operation; wherein, the size of the display window is variable, and the sliding of the pointer or the movement of the selection box in the window is synchronized with the sliding of the finger on the touch-sensitive surface, and the actual distance sliding on the touch-sensitive surface is scaled proportional to the movement distance of the pointer or the selection box in the window.

35 Claims, 11 Drawing Sheets

(51) Int. Cl.
  *G06F 3/0354* (2013.01)
  *G06F 3/0481* (2013.01)
  *G06F 9/44* (2018.01)
(52) U.S. Cl.
  CPC ........ *G06F 3/0488* (2013.01); *G06F 3/04817* (2013.01); *G06F 3/04845* (2013.01); *G06F 3/04886* (2013.01); *G06F 9/44* (2013.01); *G06F 2203/04803* (2013.01)
(58) Field of Classification Search
  CPC ............... G06F 3/0488; G06F 3/04883; G06F 3/04886; G06F 9/44
  See application file for complete search history.

(56) References Cited

U.S. PATENT DOCUMENTS

| | | | | |
|---|---|---|---|---|
| 2009/0278806 | A1* | 11/2009 | Duarte | G06F 3/03547 345/173 |
| 2010/0253620 | A1* | 10/2010 | Singhal | G06F 3/0488 345/157 |
| 2010/0273533 | A1* | 10/2010 | Cho | G06F 3/04886 455/566 |
| 2011/0102357 | A1* | 5/2011 | Kajitani | G06F 1/1643 345/173 |
| 2012/0102437 | A1* | 4/2012 | Worley | G06F 3/04883 715/863 |
| 2013/0063366 | A1* | 3/2013 | Paul | G06F 3/0416 345/173 |
| 2013/0093685 | A1* | 4/2013 | Kalu | G06F 3/04883 345/173 |
| 2013/0147731 | A1* | 6/2013 | Adachi | G06F 3/04845 345/173 |
| 2013/0249806 | A1* | 9/2013 | Crisan | G06F 3/04883 345/173 |
| 2014/0047392 | A1* | 2/2014 | Kim | G06F 3/04812 715/846 |
| 2014/0049494 | A1* | 2/2014 | Niu | G06F 3/0488 345/173 |
| 2014/0317492 | A1* | 10/2014 | Kwak | G06F 3/0485 715/234 |
| 2015/0054741 | A1 | 2/2015 | Yamano et al. | |
| 2015/0149964 | A1* | 5/2015 | Bernstein | G06F 3/04815 715/836 |
| 2015/0293616 | A1 | 10/2015 | Cheng | |
| 2016/0011678 | A1 | 1/2016 | Kwak et al. | |
| 2016/0044153 | A1* | 2/2016 | Kim | H04M 1/72522 455/418 |
| 2016/0070428 | A1* | 3/2016 | Shen | G06F 3/0485 715/784 |
| 2016/0085438 | A1* | 3/2016 | Doan | G06F 3/04883 715/863 |
| 2017/0097765 | A1 | 4/2017 | Chao | |

FOREIGN PATENT DOCUMENTS

| | | |
|---|---|---|
| CN | 104918085 A | 9/2015 |
| CN | 105389114 A | 3/2016 |
| CN | 105468286 A | 4/2016 |
| CN | 106227449 A | 12/2016 |
| DE | 102009023579 A1 | 10/2010 |
| JP | H08511637 A | 12/1996 |
| JP | 2009259079 A | 11/2009 |
| JP | 2014035772 A | 2/2014 |

OTHER PUBLICATIONS

International Search Report in corresponding PCT Application PCT/CN2017/088387, dated Aug. 30, 2017.
Supplementary European Search Report in counterpart European Application No. 17833354, dated Oct. 1, 2018.
Written Opinion in corresponding PCT Application PCT/CN2017/088387, dated Aug. 30, 2017.

* cited by examiner

METHOD AND DEVICE FOR GESTURE CONTROL AND INTERACTION BASED ON TOUCH-SENSITIVE SURFACE TO DISPLAY

CROSS-REFERENCE OF THE RELATED APPLICATIONS

The application is a continuation of International Patent Application No. PCT/CN2017/088387, with an international filing date of Jun. 15, 2017, which claims the priority of China Patent Application No. 201610592695.6, filed on Jul. 25, 2016, the entire contents of which are hereby incorporated by reference as part of the application.

TECHNICAL FIELD

The present disclosure belongs to the technical field of information input control, and more particularly relates to an input method based on a touch-sensitive surface to display, an electronic device, and an input control method and a system based on a haptic-visual technology.

BACKGROUND TECHNIQUE

Touchpad is an important input tool in addition to the keyboard and mouse, which can be embedded in a notebook or used as a separate input tool connected to the PC through data cable.

The promotion of the touchpad is a great convenience for the user, which can be used to control the movement of cursor instead of mouse. However, in many cases, merely using the touchpad brings a lot of inconveniences: for example, the current user is editing a document or is browsing a website, and at that time if the user wants to open a certain application software on the desktop, he/she needs to first return to the desktop, and then slid on the touchpad to control cursor to the target location, and then double-click it to open the application software. The entire operation process is very inconvenient, and takes a long time. If there are many shortcuts on the user's desktop, the entire operation process will take a longer time.

SUMMARY

An object of the present disclosure is to provide a gesture control and interaction technology based on a "touch-sensitive surface to display". By combining the touch-sensitive surface technology with the display technology, a novel interaction method is proposed to realize the rapid input control of information.

Specifically, according to a first aspect of the present disclosure, there is provided an input method based on a touch-sensitive surface to display, comprising the steps of:

S110: acquiring continuous sliding position information of a touching object on the touch-sensitive surface in real time.

S120. when it is determined that the continuous sliding position information conforms to a preset touch sequence, the following steps are performed:

S130: controlling the display to display a window containing icon, and continuing to acquire the continuous sliding position information of the touching object in real time; according to the continuous sliding position information of the touching object, positioning the selected location in the window in real time and controlling the display to display the pointer or the content selected in the current location in the selected location until it is determined that the touching object leaves the touch-sensitive surface, the trigger event information is then generated according to the selected current location.

According to a second aspect of the present disclosure, there is provided an electronic device comprising a display unit, a touch-sensitive surface unit and a processing unit coupled with the display unit and the touch-sensitive surface unit; the display unit is configured to display a user interface object; the touch-sensitive surface unit is configured to detect the user contact; the processing unit is configured to acquire continuous sliding position information of the touch-sensitive surface unit in real time; and when it is determined that the continuous sliding position information conforms to a preset touch sequence, the display unit is controlled to display a window containing icon, and the continuous sliding position information on the touch-sensitive surface unit is continued to be obtained in real time; according to the continuous sliding position information, the selected location is positioned in the window in real time and the display is controlled to display the pointer or the content selected in the current location in the selected location until it is determined that the information that the touching object leaves the touch-sensitive surface is obtained by the touch-sensitive surface unit, the trigger event information is generated according to the selected current location.

According to a third aspect of the present disclosure, there is provided an input control method based on a haptic-visual technology, comprising the following steps: partitioning and initializing a touchpad, and dividing the touchpad into an interface control area and an input control area; controlling a UI layer to display the virtual interface according to the information collected by the interface control area and the input control area and at the same time displaying the user's sliding operation on the touchpad on the virtual interface in real time according to the information collected by the input control area; and controlling the input content information or execution control information.

According to a fourth aspect of the present disclosure, there is provided an input control system based on a haptic-visual technology, comprising:

a touchpad partition and an initialization circuit configured to partition and initialize the touchpad, and divide the touchpad into an interface control area and an input control area;

a virtual interface display control circuit configured to control a UI layer to display a virtual interface according to the information collected by the interface control area and the input control area;

a real-time display and control input circuit configured to display the user's sliding operation on the touchpad on the virtual interface in real time according to the information collected by the input control area, and control the input content information or execution control information.

Compared with the prior art, the present disclosure provides a novel interaction mode by combining the touch-sensitive surface with the display, and quickly inputting and selecting the corresponding application functions, thereby realizing the function of lightning initiation without affecting the conventional functions of the touch-sensitive surface, and reducing the user's cognitive burden and producing a more effective man-machine interface, so it has wide application prospects; on the other hand, the touch-sensitive surface is divided into an interface control area and an input control area by partitioning and initializing the touch-sensitive surface; the UI layer is controlled to display a virtual interface according to the information collected by the interface control area and the input control area and at the same time the user's sliding operation on the touch-sensitive surface is displayed in real time on the virtual interface according to the information collected by the input control area, and input content information or execution control information is controlled; thereby rapid input control of information (which may be control information for opening a certain application program or content information such as numbers and so on) is achieved while the accuracy of the input in haptic and visual sense is ensured; also, the input control is performed by the technology of the present disclosure, especially when it is controlled to open a certain application program, it is not necessary to return to the desktop to change the current working state, and find the corresponding program to double-click to open it; thereby greatly saving the operation control time, and in turn shortening the overall response time of the system. According to a large amount of data statistics, it is showed that the corresponding operation time for those skilled in the art can be shortened by at least 50% by using the technology of the present disclosure for the input control. In addition, in the present disclosure, the touch-sensitive surface is divided into an interface control area and an input control area by using coordinate information (in the custom driver layer), and the input control area is further partitioned; wherein the interface control area is adjacent to the input control area; the sliding track information of the finger is collected by the (custom) driving layer. If the corresponding track information shows that the user's sliding operation is from the interface control area to the input control area, the UI layer is controlled to display a virtual interface; so that the virtual interface can be controlled more quickly and accurately for displaying, and the cost is low. In addition, in the present disclosure, the input control area collects the sliding track information of the finger and displays the content corresponding to the coordinate information of the current sliding track on the virtual interface in real time; the coordinate information corresponding to the end point of the sliding track is determined to obtain the corresponding input control content; the content information is input or the control information is executed according to the input control content; thereby more rapid and accurate input content information or execution control information can be achieved, operation time is short and response time of the system is reduced. Finally, in the present disclosure, if the input control area collects the information of the end point of the sliding track of the finger, the control information is sent to the driver layer, and after receiving the control information, the driver layer controls the UI layer to hide the virtual interface. Thus, it realizes the fast hiding of the virtual interface, does not occupy the interface space, and does not interfere with the normal operation and the normal browsing of related applications of the user.

BRIEF DESCRIPTION OF THE DRAWINGS

The features and advantages of the present disclosure will be more clearly understood by reference to the accompanying drawings, which are illustrative and should not be construed as limiting the disclosure in any way, in which.

The present disclosure will be further described below with reference to the accompanying drawings and specific embodiments.

DETAILED DESCRIPTION

In order to clearly understand the above objects, features and advantages of the present disclosure, the present disclosure will be further described in detail below with reference to the accompanying drawings and specific embodiments. It should be noted that, in the absence of conflict, the embodiments of the present application and the features in the embodiments may be combined with each other.

In the following description, numerous specific details are set forth in order to fully understand the present disclosure. However, the present disclosure can also be implemented in the other ways different from those described herein. Therefore, the scope of protection of the present disclosure is not limited by the specific embodiments disclosed below.

An object of the present disclosure is to provide a gesture control and interaction technology based on a "touch-sensitive surface to display". A novel interaction method is proposed by combining the touch-sensitive surface technology with the display technology. Firstly, a certain gesture is made on a touch-sensitive surface to activate a certain window of the display; the sliding of the finger on the touch-sensitive surface is synchronized in GUI of the display window by the sliding operation of the finger on the touch-sensitive surface, the finger being raised corresponds to some kind of operation; wherein, the size of the display window is variable, and the sliding of the pointer in the window or the movement of the selection box is synchronized with the sliding of the finger on the touch-sensitive surface, and the actual distance sliding on the touch-sensitive surface is scaled proportional to the movement distance of the pointer in the window or the selection box (the scale is calculated based on touch-sensitive surface size and window size). This method builds another GUI hierarchy in the system GUI hierarchy, which allows users to customize the content of the GUI in the GUI hierarchy of this method and provide users with more efficient and intuitive visual and haptic feedback to achieve the goal of faster and more efficient operation of electronic devices having a display and touch-sensitive surface, so as to improve the effectiveness, efficiency and user satisfaction in using such devices.

Figure 1:
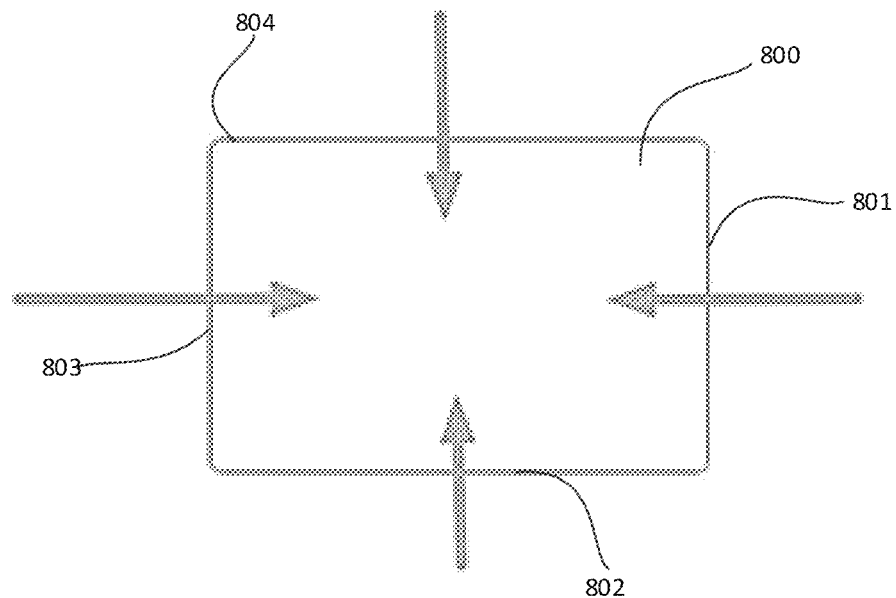
FIG. 1 is a schematic diagram of a preset sliding direction of a touching object in a touch-sensitive surface in the input method based on a touch-sensitive surface to display in an embodiment of the present disclosure.

Wherein, there are several gestures on the touch-sensitive surface 800. As shown in FIG. 1, one finger is drawn from outside of the left boundary 803 of the touchpad into the inside of the boundary, and one finger is drawn from outside of the right boundary 801 of the touch pad into the inside of the boundary, and one finger is drawn from outside of the upper boundary 804 of the touchpad into the inside of the boundary, one finger is drawn from outside of the lower boundary 802 of the touchpad into the inside of the boundary; a plurality of fingers are drawn from outside of the left boundary 803 of the touchpad into the inside of the boundary, and a plurality of fingers are drawn from outside of the right boundary 801 of the touchpad into the inside of the boundary, and a plurality of fingers are drawn from outside of the upper boundary 804 of the touchpad into the inside of the boundary, and a plurality of fingers are drawn from outside of the lower boundary 802 of the touch pad into the inside of the boundary.

Figure 2:
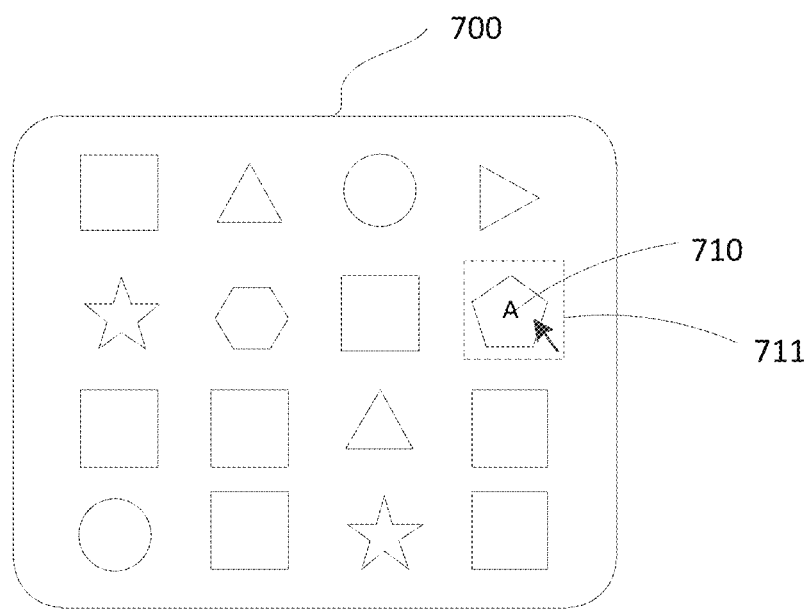
FIG. 2 is a schematic diagram of a window in the input method based on a touch-sensitive surface to display in an embodiment of the present disclosure.

Interaction process: after being drawn into the boundary of the touchpad, a window 700 similar to that shown in FIG. 2 is popped up on the screen, and an icon 710 is provided in the window. At this time, the checkbox (pointer, arrow, and finger) on the screen will move synchronously with the movement of the finger on the touch-sensitive surface. When the finger left the touch-sensitive surface, the entity content corresponding to the icon 710 corresponding to the checkbox of the response is activated, such as a function of activating a program, opening a file, opening a website, opening a folder, and executing a macro definition and the like, and the window 700 may be an application window, a display interface window, or a function window. For the specific technical content, see the following embodiments.

Embodiment 1

Figure 3:
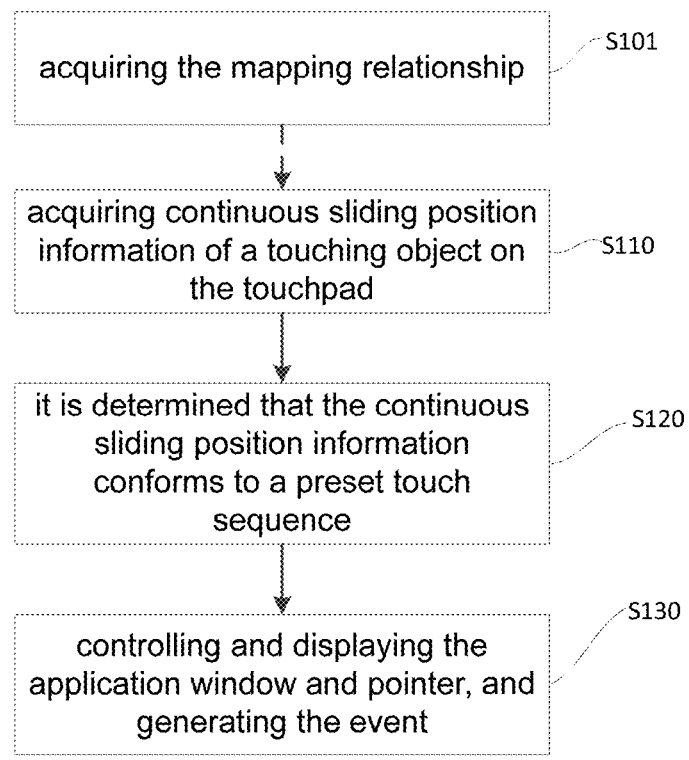
FIG. 3 is a schematic flow chart of the input method based on a touch-sensitive surface to display in an embodiment of the present disclosure.

As shown in FIG. 3, the present disclosure provides an input method based on a touch-sensitive surface to display, comprising the following steps:

S110: acquiring continuous sliding position information of a touching object on a touch-sensitive surface in real time; the continuous position information (two-dimensional coordinates) can be stored by setting special data structures such as a queue or a container. When it is determined to be a continuous sliding, the temporarily stored location information is extracted and then added with new location information to form continuous sliding location information. Specifically, the touch state of the touch-sensitive surface is obtained in real time. If the touch state of the touch-sensitive surface is being occupied all the time within the threshold time, a continuous position of the touching object is recorded, and the continuous position of the touching object is taken as the continuous sliding position information of the touching object.

S120: when the continuous sliding position information is determined to conform to the starting condition, that is, conform to the preset touch sequence, for example, the gesture of sliding matches with the pre-stored gesture (sliding direction, sliding shape), it is also possible to meet the threshold as a condition by detecting the distance of sliding, and also can be used as a condition by detecting the sliding time satisfying the threshold and the following steps are performed after the starting conditions are satisfied:

S130: controlling the display to display a window containing icon, and continuing to acquire the continuous sliding position information of the touching object in real time. According to the continuous sliding position information of the touching object, the selected location is positioned in real time in the window and the display is controlled to display the pointer or the content selected in the current location in the selected location until it is determined that the touching object leaves the touch-sensitive surface, the trigger event information is generated according to the selected current location. Due to the real-time mapping relationship between the selected location and the position of the touching object on the touch-sensitive surface, the step of generating the trigger event information according to the selected current location may directly generate the trigger event information by directly using the position of the touching object on the touch-sensitive surface. As shown in FIG. 2, the window is provided with various icons corresponding to different applications, such as specifically an application program, a document file, a folder, a website, and a macro definition and the like. The corresponding trigger event information is generated through the pre-stored mapping relationship and this trigger event information is put into the event processing process in the Windows system or the OS system, that is, it can perform the event-related application, that is, the function of quick start and lightning start is realized. In the embodiment of the present disclosure, the movement of the pointer in the window is controlled by a touch-sensitive object (such as a human finger or an artificial metal finger) on the touch-sensitive surface. By sliding the touching object, the pointer also slides accordingly. However, since the dimensions between the window and the touch-sensitive surface are often inconsistent, the position can be mapped based on the proportional relationship, for example, the position information in the length direction is determined according to the proportion of the length of the window to the length of the touch-sensitive surface and the position information in the width direction is determined according to the proportion of the width of the window to the width of the touch-sensitive surface. Other proportional relationships may also be used. The above-mentioned proportional relationship uses an absolute position mapping, and may also use a relative position mapping, that is, a position increment is used to control real-time positioning of the pointer position. The display interface of the window containing the icon can control the icon therein and the application entity corresponding to the icon in a preset manner, and can establish a mapping table by establishing an icon and a location relationship stored by the application entity, and when needed (i.e., when the touching object is lifted), the corresponding entity information (file storage location) is found in the mapping table, and then the event information is generated to perform the implementation. It should be noted that the above pointer may also be a hidden pointer. That is, the selected location is positioned in the window in real time according to the continuous sliding position information of the touching object and the display is controlled to display a pointer in the selected location or show the selected content in the current location. When the selected location is within the selected range of the icon in the window (a circle or a square based on the center of the icon or a graphic range occupied by the icon graphic), the icon or the selected range of the icon is highlighted, so that the user can intuitively know the selected location positioned in the window. It should be noted that the selected location can be arranged continuously or can also be arranged at intervals. When the selected location is continuously arranged, there are always the highlighted contents in the window. When the selected location is arranged at intervals, once the touching object (finger) is moved, a highlighted area can be displayed, so the selected current location can be known. The present disclosure may combine highlighting with displaying a pointer, the icon will be highlighted when the selected location falls within the selected range of the icon, and the pointer will be displayed in the selected location when the selected location falls outside the selected range of the icon, and it is convenient for users to find the selected current location in real time and intuitively.

In step S130 of the present disclosure, it is determined that if the current location in the continuous sliding position information is in a cancellation area of the touch-sensitive surface when the touching object leaves the touch-sensitive surface, information for closing the window is generated. It is convenient for the user to cancel the current operation.

In order to ensure the reliability of the input and the accuracy of icon selection made by the user, in step S130, the step of generating the trigger event information according to the selected location specifically comprises: when the position of the pointer falls into the selected range of the icon in the window, the event information that triggers the entity associated with the icon is generated. As shown in FIG. 2, the selected range 711 of the A icon 710 is a frame centered at the icon A, and may also be circular. In order to ensure that the memory footprint is reduced, after the step of generating the event information that triggers the entity associated with the icon, it further comprises: generating information for closing the window, and eliminating storage location information and window display information.

In order to facilitate the timely exit from the window or timely exit from the interactive system and the input system, in step S130, the step of generating the trigger event information according to the position information of the pointer specifically further comprises: when the selected location falls outside the selected range of the icon in the window, information for closing the window is generated, that is, to exit and give up the sliding operation.

In step S130, the step of determining that the touching object leaves the touch-sensitive surface comprises acquiring the touch state of the touch-sensitive surface in real time, if the touch state of the touch-sensitive surface is changed from being occupied to being unoccupied, it is determined that the touching object leaves the touch-sensitive surface. It can also be determined by various states of the touch-sensitive surface including click, tap, hold, and off (finger up), that is, when the state of the touch-sensitive surface changes from hold to off, the touching object can be considered to be raised.

Figure 4:
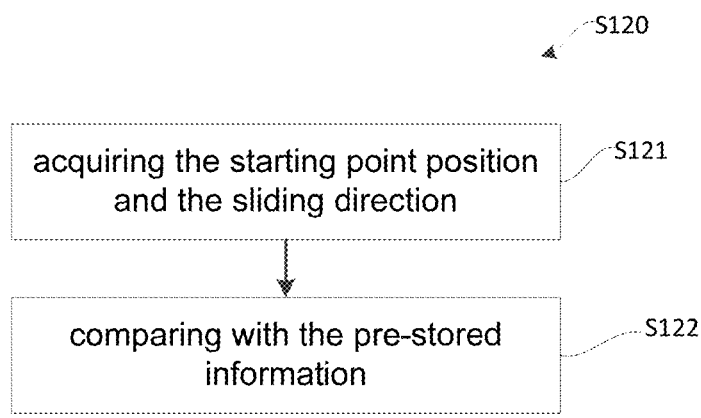
FIG. 4 is a schematic flow chart of determining of the input method based on a touch-sensitive surface to display in an embodiment of the present disclosure.
Figure 5:
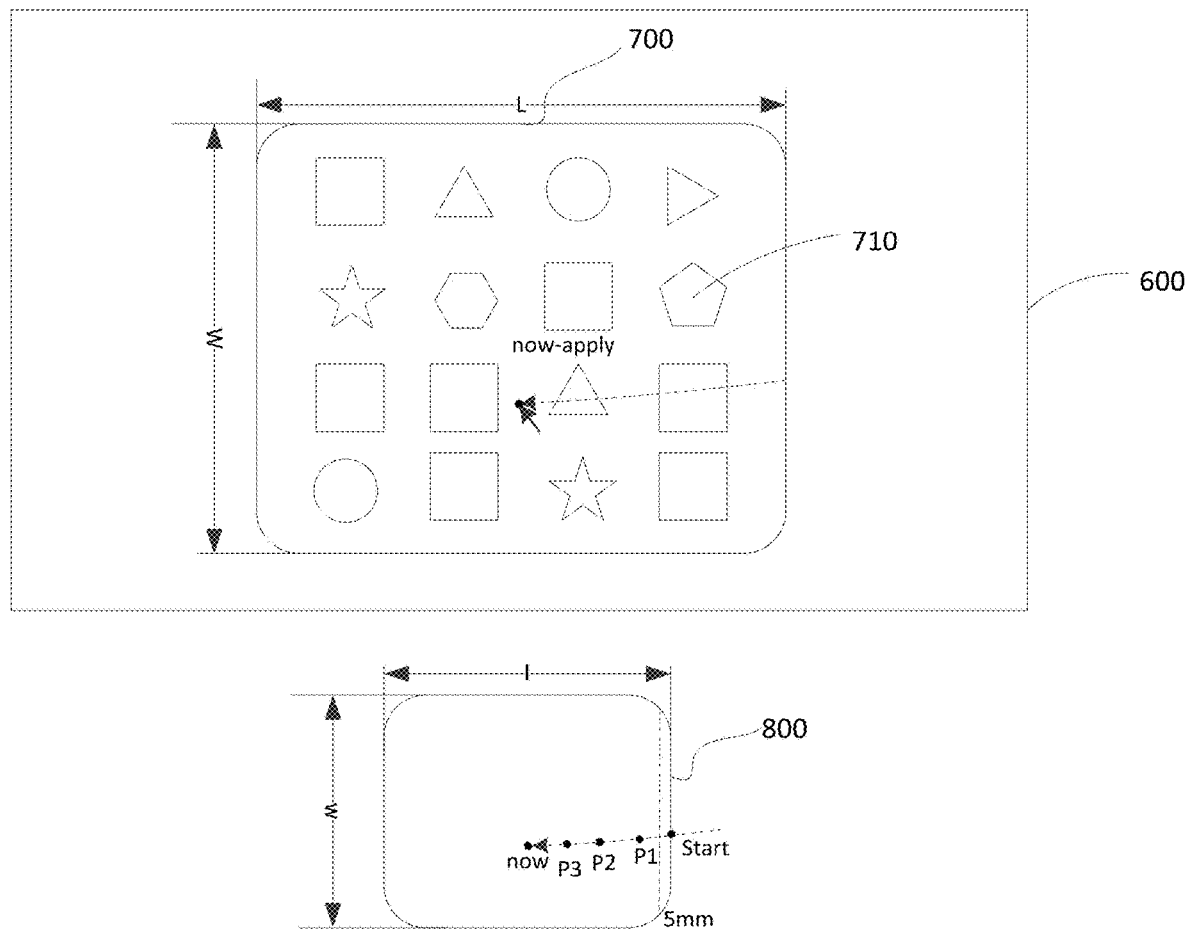
FIG. 5 is a schematic diagram of a touch-sensitive surface and the corresponding window of the input method based on a touch-sensitive surface to display in an embodiment of the present disclosure.

As shown in FIG. 4, the step of the continuous sliding position information is determined to conform to the starting condition in step S120 specifically comprises:

S121: acquiring a starting point position and a sliding direction according to the continuous sliding position information; information of the sliding direction may be obtained by directly reading, or may be obtained through multiple pieces of position information. Specifically, the positions of a plurality of points in the continuous sliding position information are obtained. The average direction vector is calculated based on the position of the plurality of points and the starting point position, and the average direction vector is taken as the sliding direction. As shown in FIG. 5, the window 700 is displayed on the display 600. A plurality of position points (P1, P2, P3) (including two-dimensional position information) are taken out from the continuous sliding position information to form a plurality of direction vectors S1 (start point to P1), S2 (start point to P2) and S3 (start point to P3), and the average direction vector is calculated (S1=S1+S2+S3)/3) as the direction vector corresponding to the sliding direction.

S122: comparing the starting point position and the sliding direction with the pre-stored information, and if they match, the continuous sliding position information is determined to conform to the starting condition. When a specific comparison is performed, it can be directly compared with the pre-stored sliding direction vector to calculate the included angle by using the plane geometry knowledge. If the included angle is less than the threshold value, such as 5 degrees less, it is determined to being consistent. Specifically, when it is determined that the starting point position falls into the edge region of the touch-sensitive surface and an included angle between the sliding direction and the corresponding edge of the edge region is greater than the threshold value (a maximum value of 90 degrees), if the included angle with the edge is greater than 60 degrees, it can be determined to conform to the angle determination, and the continuous sliding position information is determined to conform to the starting condition. The edge area is an edge of the touch-sensitive surface, and the edge area can be set to that including 5 mm inward from the edge, so as to ensure the tolerance and improve the practicality of the input method. In order to reduce false touch to start the present input method, when it is determined that the included angle is greater than the threshold value, the current location of the touching object is acquired. The sliding distance is acquired according to the current location and the starting point position, and if the sliding distance is greater than the threshold value, the continuous sliding position information is determined to conform to the starting condition. As shown in FIG. 5, when the distance from the starting position Start to the current point now is greater than a threshold value, such as greater than 15 mm, it is determined to be the start.

The present disclosure detects the gesture of sliding in from the edge, which is based on the following considerations: some gesture recognition functions have already been self-contained in the computers and touch-control operation device with touch-sensitive surfaces corresponding to the existing windows and OS systems. In order to prevent the gesture of the touching object in the present disclosure from starting erroneously the corresponding gesture function self-contained in the windows or OS system, the present disclosure detects the gesture of sliding from the edge.

As described above, in step S130, the step of positioning the pointer in the window 700 in real-time specifically comprises: acquiring the current location information of the touching object, and acquiring the location of the pointer according to the corresponding relationship between the size of the touch-sensitive surface 800 and the size of the window 700. As shown in FIG. 5, if the length and width parameters of the window 700 are L*W and the length and width parameters of the touch-sensitive surface are l*w, the current point now (xnow, ynow) on the touch-sensitive surface is mapped onto the position now-apply (xnow*L/l, ynow*W/w) on the window.

There are various application entities in the present disclosure, and the step of generating event information that triggers an entity associated with the icon comprises one or more of: a step of generating event information for opening an executable file; a step of generating event information for opening a file; a step of generating event information for opening a file folder; a step of generating event information for open a website; and a step of generating event information for performing a macro definition.

Figure 6:
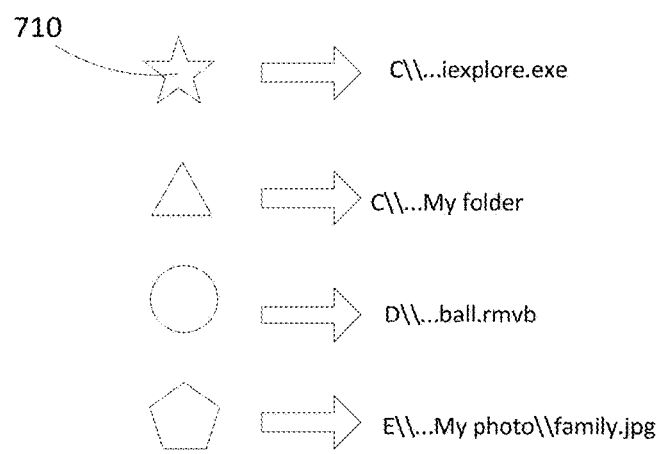
FIG. 6 is a schematic diagram of a mapping relationship between an icon and an application entity of the input method based on a touch-sensitive surface to display in an embodiment of the present disclosure.

It further comprises before step S110:

S101 acquiring and saving the icon and the mapping relationship between the icon and the entity. As shown in FIG. 6, the relationship between the icon and the application is established.

Figure 7:
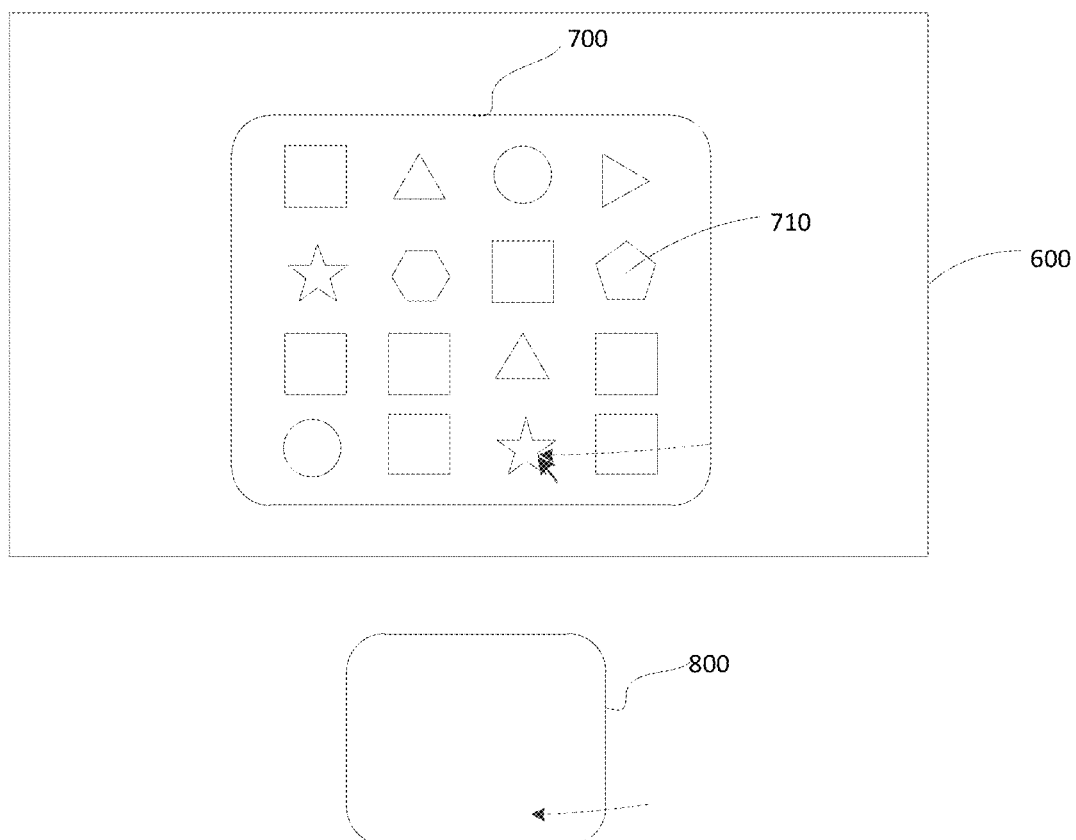
FIG. 7 is a schematic diagram of the input method based on a touch-sensitive surface to display in an embodiment of the present disclosure.

A specific implementation process is listed below. As shown in FIG. 7, the touching object (finger) slides a distance inwardly from the right boundary at the touch-sensitive surface 800, and then a window 700 is displayed on the display 600 (the display location may be the center of the display 600 in default, and may also be other locations), an icon 710 is displayed in the window 700, and then the finger continues to slide, and the pointer moves accordingly in the corresponding window 700. When moving to the pentagram icon in the lower right corner, the touching object is lifted, and the operation for opening the browser (C\\ . . . iexplore-.exe) is performed according to the mapping relationship of FIG. 6. The application can be quickly started by simple sliding operation.

Embodiment 2

Figure 8:
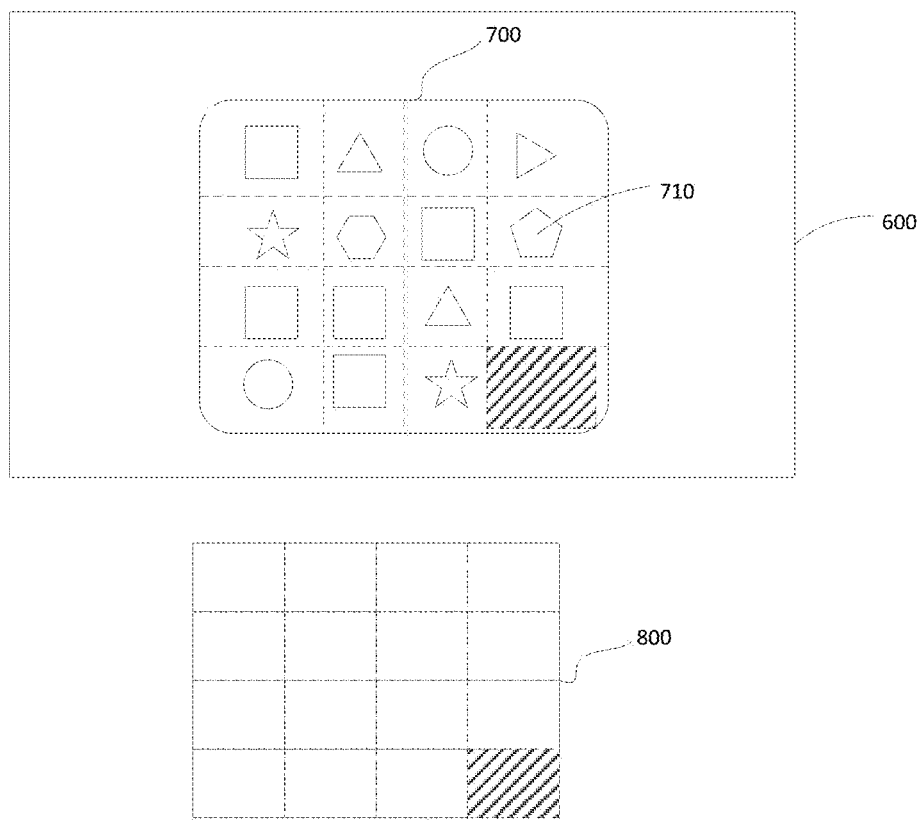
FIG. 8 is a schematic diagram of a touch-sensitive surface partitions in the input method based on a touch-sensitive surface to display in an embodiment of the present disclosure.
Figure 9:
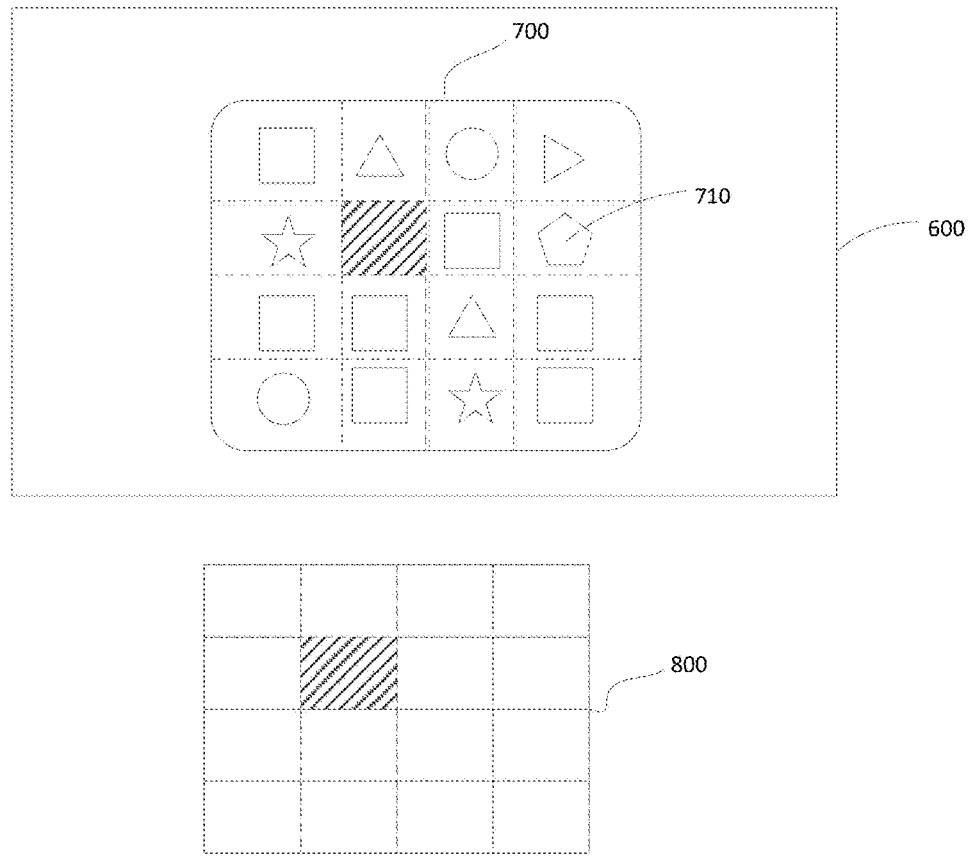
FIG. 9 is a schematic diagram of sliding corresponding display in the input method based on a touch-sensitive surface to display in an embodiment of the present disclosure.
Figures 10, 11:
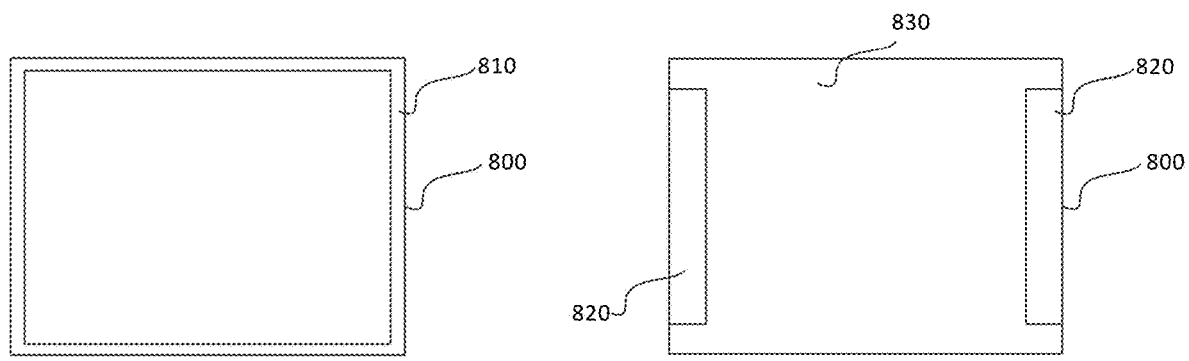
FIG. 10 is a schematic diagram of the position of the touch-sensitive surface cancellation area in the input method based on the touch-sensitive surface to display in an embodiment of the present disclosure.
FIG. 11 is a schematic diagram of the positions of the touch-sensitive surface triggering area and the invalid area in the input method based on a touch-sensitive surface to display in an embodiment of the present disclosure.
Figure 12:
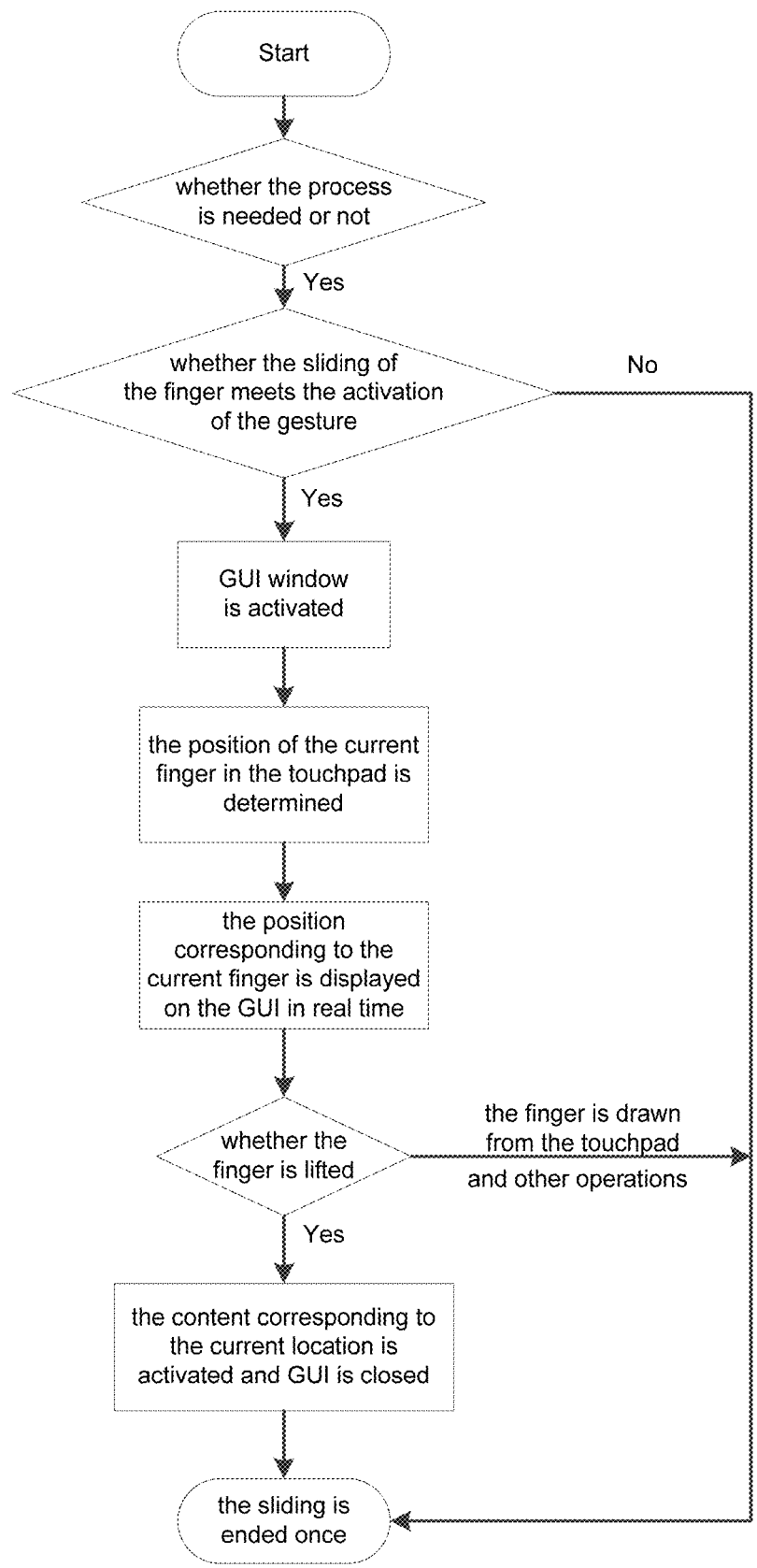
FIG. 12 is a schematic flow chart of the input method based on a touch-sensitive surface to display in an embodiment of the present disclosure.

The present embodiment of the present disclosure continues to provide an input method based on a touch-sensitive surface to display. The touch-sensitive surface 800 is divided into 16 areas as shown in FIG. 8, and the corresponding window 700 in the display 600 is also divided into 16 areas. Each area in the touch-sensitive surface corresponds to each area in the display 600. An icon 710 or blank display content is provided in the area in the window 700. The processing process is as shown in FIG. 12. The continuous sliding position information on the touch-sensitive surface is acquired by the processor or the electronic device in real time, and after it is determined that the preset touch sequence is met, the window is displayed and the highlighted position in the window is positioned according to the current location in the continuous sliding position information. If the current touching object is in a lower right corner region of the touch-sensitive surface, an icon or a region in a lower right corner of the window is correspondingly highlighted; and a highlighted region is moved by receiving the continuous sliding position information of the touching object on the touch-sensitive surface. And at this time if the touching object moves to the middle region of the touch-sensitive surface, the corresponding middle region in the window is highlighted as shown in FIG. 9; until it is determined that the current touching object leaves the touch-sensitive surface, the trigger event information is generated according to the position of the touching object when it leaves. For example, when the touching object leaves, if the highlighted icon is the icon of the browser, information for the execution of opening the browser is generated and information for closing the window is generated at this time. As another example, if the highlighted icon is a notepad icon, information for the execution of opening the notepad function is generated and information for closing the window is generated at this time. As another example, when the touching object leaves the touch-sensitive surface, if the position where the touching object is located corresponds to a cancelation area on the touch-sensitive surface, information for the execution of closing the window is generated at this time. Specifically, as shown in FIG. 10, the cancellation area 810 is located at an edge location of the touch-sensitive surface 800, such as accounts for 2%, or 1%, or 5% of the length or width dimension of the touch-sensitive surface. As shown in FIG. 11, the touch-sensitive surface may be divided into a trigger area 820 and an invalid area 830. The step that it is determined that the preset touch sequence is met comprises: determining that a starting point of the continuous sliding position information is located in the trigger area and that when the distance between the current point of the continuous sliding position information and the starting point reaches the threshold value, it is determined to conform to the preset touch sequence. The width of the trigger area accounts for 5%, or 3%, or 10% of the length or width dimension of the touch-sensitive surface. By continuously sliding the touching object, the highlighted position in the window changes continuously, and the touching object is lifted, and the application corresponding to the icon in the highlighted position is executed, so as to provide a quick start application function.

Embodiment 3

The present embodiment of the present disclosure continues to provide an input method based on a touch-sensitive surface to display, the principle thereof is similar to that of the above embodiments, except that the window is not provided with a continuously arranged grid area, but instead an icon. When the position corresponding to the touching object falls within the selected range of the icon, the icon is highlighted. And when the touching object is lifted or left the touch-sensitive surface, the trigger event information is generated according to the position information of the touching object or the currently selected location information in the window. Further, it also comprises the cancellation function, and the principle thereof is similar to that of the above embodiments.

Embodiment 4

The present embodiment of the present disclosure continues to provide an input method based on a touch-sensitive surface to display, the principle thereof is similar to that of the above embodiments, except that instead of using the highlight to locate the selected location in the window, a pointer is used. After the window is opened, the selected location in the window is positioned in real time according to the position of the touching object on the touch-sensitive surface, and the pointer is displayed at the selected location. When the position for displaying the pointer falls within the selected range of the icon, the icon may be highlighted or may be not. When it is detected in the continuous sliding position information that the touching object lifts or leaves the touch-sensitive surface, the trigger event information is generated according to the position of the current pointer or the position of the current touching object.

Embodiment 5

Figure 13:
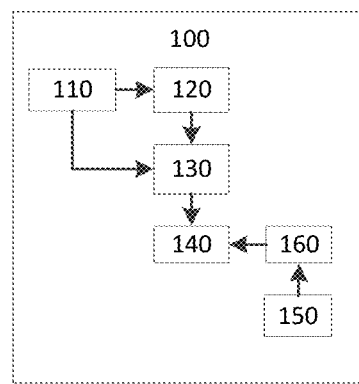
FIG. 13 is a schematic structural diagram of the input control system based on a touch-sensitive surface to display in an embodiment of the present disclosure.

The present disclosure is based on the input control methods in Embodiment 1 to Embodiment 4. As shown in FIG. 13, there is further provided an input control system 100 based on a touch-sensitive surface to display comprising a position information acquisition circuit 110, a determination circuit 120 connected to the position information acquisition circuit 110, a display control circuit 130 connected to the determination circuit 120 and the position information acquisition circuit 110, and an event trigger generation circuit 140 connected to the display control circuit 130.

The position information acquisition circuit 110 is configured to acquire continuous sliding position information of a touching object on the touch-sensitive surface 800 in real time and transmit the continuous sliding position information to the determination circuit 120 and the display control circuit 130; the continuous sliding position information includes the position information of the touching object and the state information of the touch-sensitive surface.

The determination circuit 120 is configured to transmit a signal to the display control circuit 130 when it is determined that the continuous sliding position information conforms to the starting condition.

The display control circuit 130 is configured to generate information for displaying a window containing an icon on the display 600 and acquire continuous sliding position information of the touching object in real time, and generate the real-time position information of the pointer in the window and the real-time display information of the pointer in the window according to the continuous sliding position information of the touching object; the display control circuit 130 is further configured to send the real-time position information of the pointer in the window to the event trigger generation circuit 140 when it is determined, according to the continuous sliding position information of the touching object, that the touching object leaves the touch-sensitive surface;

The event trigger generation circuit 140 is configured to generate trigger event information according to the real-time position information of the pointer in the window.

The event trigger generation circuit 140 is specifically configured to generate event information that triggers an entity associated with the icon 710 when the pointer position falls within the selected range 711 of the icon 710 in the window 700.

The event trigger generation circuit 140 is further configured to generate information for closing the window after generating the event information that triggers the entity associated with the icon 710.

The event trigger generation circuit 140 is further configured to generate the information for closing the window 700 as shown in FIG. 5 when the pointer position falls outside the selected range of the icon in the window.

The location information acquisition circuit 110 is specifically configured to acquire the touch state of the touch-sensitive surface 800 in real time. If the touch state of the touch-sensitive surface 800 is being occupied all the time within a threshold time (for example, 500 ms), the continuous position of the touching object is recorded, and the continuous position of the touching object is taken as the continuous sliding position information of the touching object.

The step of determining by the display control circuit 130 that the touching object leaves the touch-sensitive surface comprises acquiring the touch state of the touch-sensitive surface 800 in real time. If the touch state of the touch-sensitive surface 800 is changed from occupied to unoccupied, it is determined that the touching object leaves the touch-sensitive surface 800.

The determination circuit 120 is specifically configured to acquire a starting point position and a sliding direction according to the continuous sliding position information; compare the starting point position and the sliding direction with the pre-stored information, and if they match, it is determined that the continuous sliding position information conforms to the starting condition.

The step of acquiring the sliding direction by the determination circuit 120 comprises: acquiring the positions of a plurality of points in the continuous sliding position information, calculating an average direction vector based on the positions of the plurality of points and the starting point position, and taking the average direction vector as the sliding direction.

The determination circuit 120 is also specifically configured to determine that when the starting point position falls within an edge region (such as within 5 mm from the edge) of the touch-sensitive surface and the included angle between the sliding direction and the corresponding edge of the edge region is greater than a threshold value (for example, greater than 60 degrees), it is determined that the continuous sliding position information conforms to the starting condition.

The determination circuit 120 is also specifically configured to acquire the current location of the touching object after determining that the included angle is greater than a threshold value, and acquire a sliding distance according to the current location and the starting point position, and if the sliding distance is greater than the threshold value, it is determined that the continuous sliding position information conforms to the starting condition.

The step of the display control circuit 130 generates the real-time location information of the pointer in the window 710 comprises acquiring the current location information of the touching object, and acquiring the position of the pointer according to the correspondence relationship between the size of the touch-sensitive surface 800 and the size of the window.

The event trigger generation circuit 140 is further configured to generate one or more of event information for opening an executable file, event information for opening a file, event information for opening a file folder, event information for opening a website, and event information for performing a macro definition.

The input system 100 of the present disclosure further comprises a mapping relationship establishment circuit 150, configured to acquire and store the icon and the mapping relationship between the icon and the entity in the memory 160. The event trigger generation circuit 140 is configured to acquire the mapping relationship from the memory 160.

The touch-sensitive surface mentioned in Embodiment 1 to Embodiment 5 described above includes a functional film layer or device with a touch-sensitive function, such as touchpad, mobile phone contact layer, tablet touch layer, etc.

The display mentioned in Embodiment 1 to Embodiment 5 described above includes a film layer or a device having a display function such as a laptop display, a desktop display, a TV display or a mobile display screen, and a tablet display screen, etc.

Embodiment 6

Figure 14:
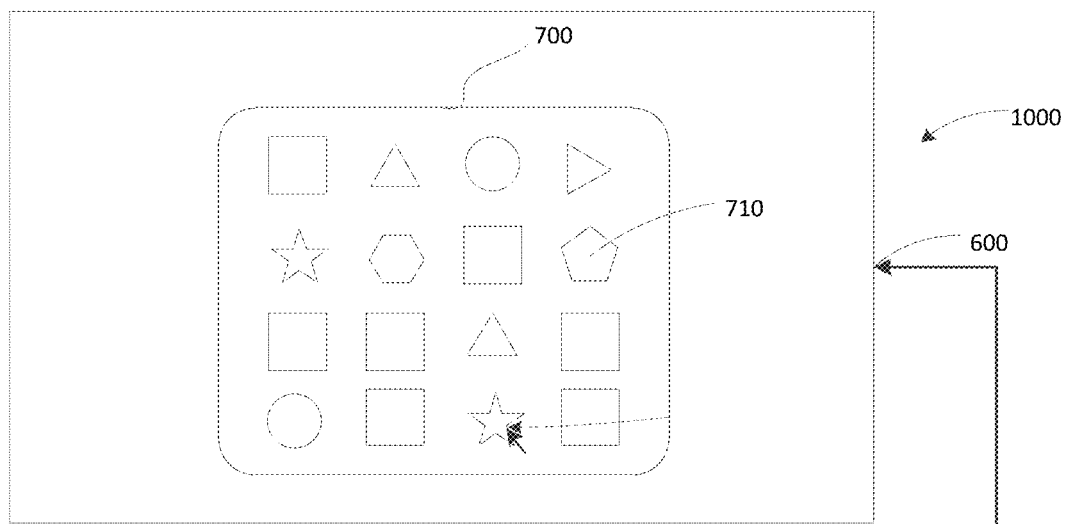
FIG. 14 is a structural diagram of the input system in an embodiment of the present disclosure.
Figure 14:
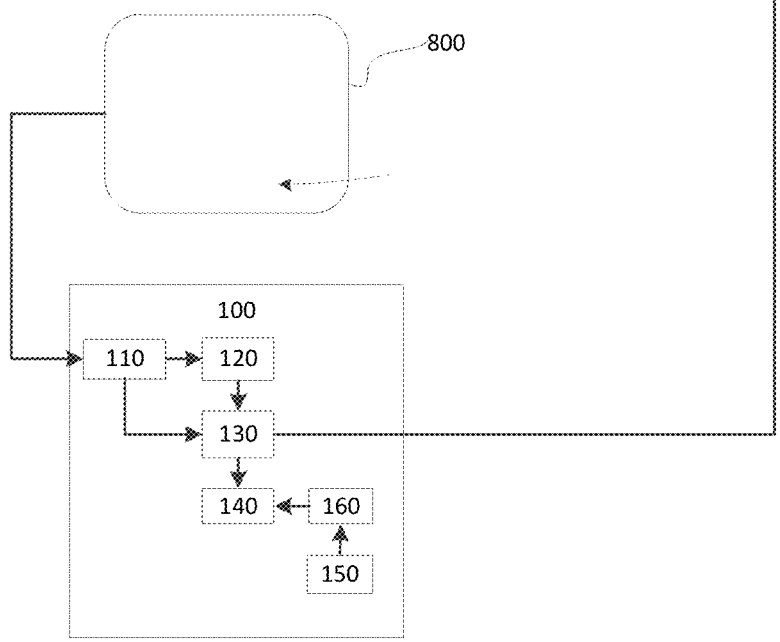

The present disclosure is based on the above input control method based on a touch-sensitive surface to display and an input control system based on a touch-sensitive surface to display. As shown in FIG. 14, there is further provided an input system 1000 comprising a touchpad 800, a display screen 600, and an input control system 100 described above. Specifically, the touchpad 800 is connected to the position information acquisition circuit 110, and the display screen 600 is connected to the display control circuit 130. The input system of the disclosure can quickly start a preset application and realize personalization.

Embodiment 7

An electronic device including a display unit and a touch-sensitive surface unit is described in the following description. However, it should be understood that the electronic device optionally comprises one or more other physical user interface devices, such as a physical keyboard, a mouse, and/or a control rod. The device generally supports a variety of application programs, such as one or more of the following application programs: drawing application, presentation application, word processing application, website creation application, disc editing application, spreadsheet application, game application, phone application, video conferencing application, e-mail application, instant messaging application, fitness support application, photo management application, digital camera application, digital video camera application, web browsing application, digital music player application and/or digital video player application.

Figure 15:
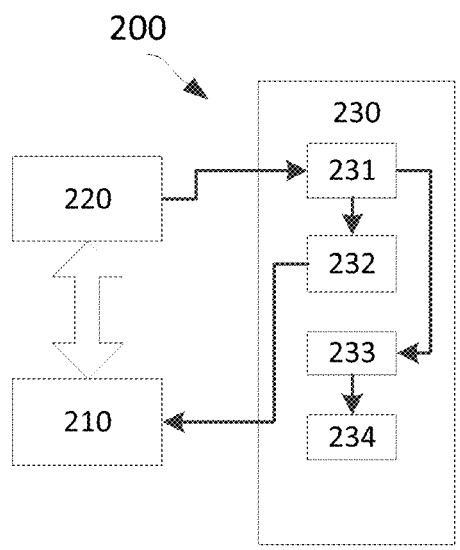
FIG. 15 is a structure diagram including a display unit and a touch-sensitive surface unit in an embodiment of the present disclosure.

As shown in FIG. 15, the present disclosure provides an electronic device 200 comprising a display unit 210, a touch-sensitive surface unit 220, and a processing unit 230 coupled to the display unit 210 and the touch-sensitive surface unit 220; the display unit 210 is configured to display a user interface object; the touch-sensitive surface unit 220 is configured to detect the user contact; the processing unit 220 is configured to acquire continuous sliding position information of the touch-sensitive surface unit 220 in real time. When it is determined that the continuous sliding position information conforms to a preset touch sequence, the display unit 210 is controlled to display a window containing an icon and the processing unit 230 continues to obtain the continuous sliding position information on the touch-sensitive surface unit 220 in real time. According to the continuous sliding position information, the selected location is positioned in the window in real time and the display unit is controlled to display the pointer and the content selected in the current location at the selected location until it is determined that the fact that the touching object leaves the touch-sensitive surface unit is acquired by the touch-sensitive surface unit 220, the trigger event information is generated according to the selected current location. The processing unit 230 is further configured to perform the corresponding function according to the trigger event information. A gesture, i.e., a touch sequence, is made on the touch-sensitive surface unit 220. After the specified touch sequence is detected by the processing unit 230, a pre-stored GUI window of the display unit 210 is activated; the movement of the pointer or selection of the object is performed in the corresponding GUI window by sliding the finger on the touch-sensitive surface unit 220; and the pointer or object operation is activated when the fingers leave.

The processing unit 230 specifically comprises a detection unit 231 coupled to the touch-sensitive surface unit 220, a real-time display unit 232 connected to the detection unit 231, and a feedback unit 233 connected to the detection unit 231. The real-time display unit 232 is further coupled to the display unit 232. The detection unit 231 is configured to acquire the continuous sliding position information on the touch-sensitive surface unit 220 in real time, generate the activation information when determining that the continuous sliding position information conforms to the preset touch sequence, and send the activation information to the real-time display unit 232, the detection unit 231 is configured to continue to acquire the continuous sliding position information and send the continuous sliding position information to the real-time display unit 232 until it is determined that the touching object on the touch-sensitive surface leaves, the current location of the touching object is sent to the feedback unit 233. The real-time display unit 232 is configured to control the display unit 210 to display a window according to the activation information and generate a selected location according to the continuous sliding position information, and control the display unit 210 to display the pointer or the content selected in the current location in the window according to the selected location. The feedback unit 233 is configured to generate trigger event information according to the current location of the touching object. The processing unit 230 further comprises an execution unit 234. The feedback unit 233 sends the trigger event information to the executing unit 234. A user interaction method for quickly starting applications is realized. When the user slides the gesture on the touch-sensitive surface unit 220 and the gesture conforms to the preset touch sequence, the display window is activated and the movement of the pointer or highlighted position in the window is continued by sliding, and the selected location in the current window is fed back to the user. The user lifts his finger to implement the application selected in the corresponding window.

The real-time display unit 232 is configured to control, according to the selected location, the display unit 210 to display a pointer or a content selected in the current location in the window, and the real-time display unit 232 is specifically configured to: generate, when the selected location falls within the selected range of the icon in the window, information for controlling the display unit 210 to highlight the icon and/or the selected range of the icon. And/or the real-time display unit 232 is further specifically configured to generate, when the selected location falls outside the selected range of the icon in the window, information for controlling the display unit 210 to display the pointer at the selected current location.

After it is determined that the continuous sliding position information conforms to the preset touch sequence, the detection unit 231 is further configured to generate information for closing the window when it is determined that the touching object is in the cancellation area of the touch-sensitive surface unit 220 and send such information for closing the window to the real-time display unit 231, and the real-time display unit 231 controls the display unit 210 to close the window.

The detection unit 231 is further configured to generate information for closing the window to the real-time display unit 232 when it is determined that the touching object on the touch-sensitive surface unit 220 leaves, and the real-time display unit 232 controls the closing of the window.

The cancellation area of the touch-sensitive surface unit 220 is located at the edge of the touch-sensitive surface unit 220 and the width of the cancellation area is 2%, or 1%, or 5% of the width or length of the touch-sensitive surface unit 220.

The feedback unit 233 is specifically configured to generate event information that triggers an entity associated with the icon when the current location of the touching object falls within the selected range of the icon in the window.

The feedback unit 233 is further configured to generate information for closing the window after generating the event information that triggers the entity associated with the icon.

The feedback unit 233 is further configured to generate information for closing the window when the current location of the touching object falls outside the selected range of the icon in the window.

The detection unit 233 is specifically configured to obtain the touch state of the touch-sensitive surface unit 220 in real time. If the touch state of the touch-sensitive surface unit 220 is being occupied all the time within the threshold time, the continuous position of the touching object is recorded, and the continuous position of the touching object is taken as the continuous sliding position information of the touching object.

The step of the detection unit 233 determining that the touching object leaves the touch-sensitive surface unit 220 comprises acquiring the touch state of the touch-sensitive surface unit 220 in real time. If the touch state of the touch-sensitive surface unit 220 is changed from being occupied to being unoccupied, it is determined that the touching object leaves the touch-sensitive surface unit 220.

The detection unit 233 is specifically configured to: acquire a starting point position and a sliding direction according to the continuous sliding position information; compare the starting point position and the sliding direction with the pre-stored information, and if they match, it is determined that the continuous sliding position information conforms to the pre-set touch sequence.

The step of acquiring the sliding direction by the detection unit 233 comprises: acquiring positions of a plurality of points in the continuous sliding position information, calculating an average direction vector based on the positions of the plurality of points and the starting point position, and taking the average direction vector as the sliding direction.

The detection unit 233 is further specifically configured to determine that the continuous sliding position information conforms to the preset touch sequence when it is determined that the starting point position falls within the edge region of the touch-sensitive surface unit 220 and the included angle between the sliding direction and the corresponding edge of the edge region is greater than a threshold value.

The detection unit 233 is further specifically configured to acquire the current location of the touching object after determining that the included angle is greater than a threshold value, and acquire a sliding distance according to the current location and a starting point position, and if the sliding distance is greater than the threshold value, it is determined that the continuous sliding position information conforms to a preset touch sequence.

The step of generating the selected location in the window by the real-time display unit 232 comprises acquiring the current location information of the touching object, and acquiring the position of the pointer according to the correspondence relationship between the size of the touch-sensitive surface unit and the size of the window.

The feedback unit 233 is further configured to generate, according to the current location of the touching object, one or more of event information for opening an executable file, event information for opening a file, event information for opening a file folder, event information for opening a website, and event information for performing a macro definition.

The electronic device in the present disclosure further comprises a mapping relationship establishment unit, configured to acquire and store the icon and the mapping relationship between the icon and the entity.

The electronic device in the present disclosure further comprises a storage unit, configured to store the icon and the mapping relationship between the icon and the entity.

When generating the trigger event information, the feedback unit 233 obtains the actual entity information (storage location information) by reading the mapping relationship between the icon and the entity from the storage unit, thereby generating the trigger event information.

The display unit 210 includes one or more of a computer display, a mobile phone display, a tablet computer display.

The touch-sensitive surface unit 220 includes one or more of a notebook touch-sensitive surface, a touch screen of a mobile phone, and a touch screen of a tablet.

It should be noted that the processing unit, the display unit, the touch-sensitive surface unit, the detection unit, the real-time display unit, the feedback unit and the execution unit as described above may all be hardware circuits, that is, may be replaced by a processing circuit, a display circuit, a touch-sensitive surface circuit, a detection circuit, a real-time display circuit, a feedback circuit and an execution circuit, but may also be a separate processor for performing certain function.

In some embodiments, the processing unit 230 described above is configured to: a, detect a contact on the touch-sensitive surface unit, detect a sequence of movements of the contact on the touch-sensitive surface unit, wherein the sequence of movements corresponds to the user's GUI in the activation method, and read the user's GUI configuration; b, further detect the user's movement on the touchpad and the synchronization of the output of the movement of the user's real-time display unit on the GUI interface with the display; c, until it is determined that the finger left, and then the current location information is fed back to the feedback unit and the corresponding configuration information of the GUI is transmitted to the generating unit or the stopping unit, and corresponding operation is performed on the computer.

In some embodiments, the specific sequence in the step a may be a continuous operation of a single gesture, and may also be a continuous operation of a plurality of the gestures, or the like, a collection of a continuous operation of one finger and a continuous operation of a plurality of the fingers.

In some embodiments, the movement tracking in the step b and the tracking output of the GUI interface may be the tracking of a pointer or may also be a choice of a certain object.

In some embodiments, the current location in the step c may be an object corresponding to the mouse pointer at a certain position in the GUI, and may also be a blank area corresponding to the pointer, or may also be a position of certain selected object in the GUI, and may be a certain specific instruction area in the GUI.

In some embodiments, if the current location in the step c corresponds to the responded object, it may be an opening of the object, or may also be a certain system operation self-defined by the user, or may also be a certain operation self-defined by the user on the object.

In some embodiments, if the current location in the step c corresponds to a blank area, it can call the stopping unit, the GUI disappears, and no operation is performed.

In some embodiments, if the current location in the step c corresponds to a certain specific instruction area in the GUI, it can call the stopping unit, the GUI disappears, and no operation is performed, and it may also be some system instructions.

In some embodiments, the GUI interface in the step b may be transparent.

Figure 16:
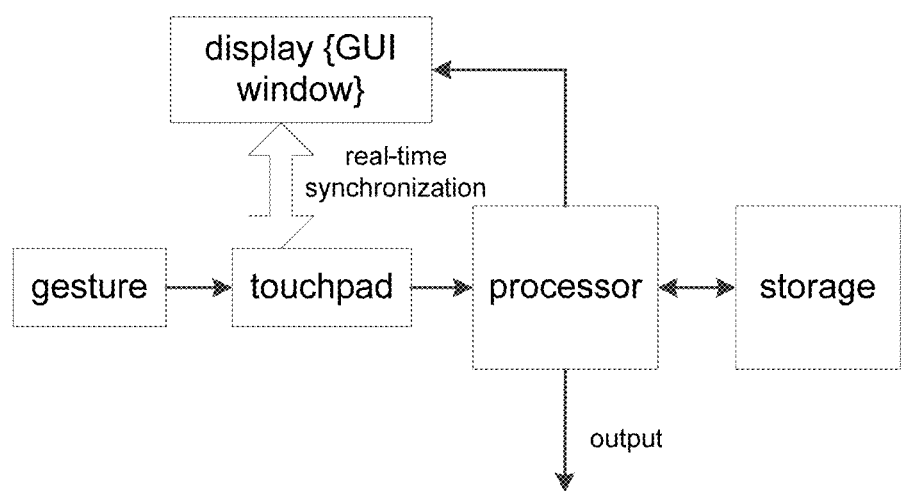
FIG. 16 is a structure diagram of a system application including a display unit and a touch-sensitive surface unit in an embodiment of the present disclosure.

The electronic device 200 described above transmits the gesture acquired on the touch-sensitive surface to the processor in the process of the actual application, as shown in FIG. 16. The processor compares and processes the gesture information with the information in the memory, and then a window is displayed on the display, and continuous position information is further acquired, and it is determined that trigger event information is generated according to the last position of the finger after the finger is lifted, the corresponding application function is performed.

Embodiment 8

Figure 17:
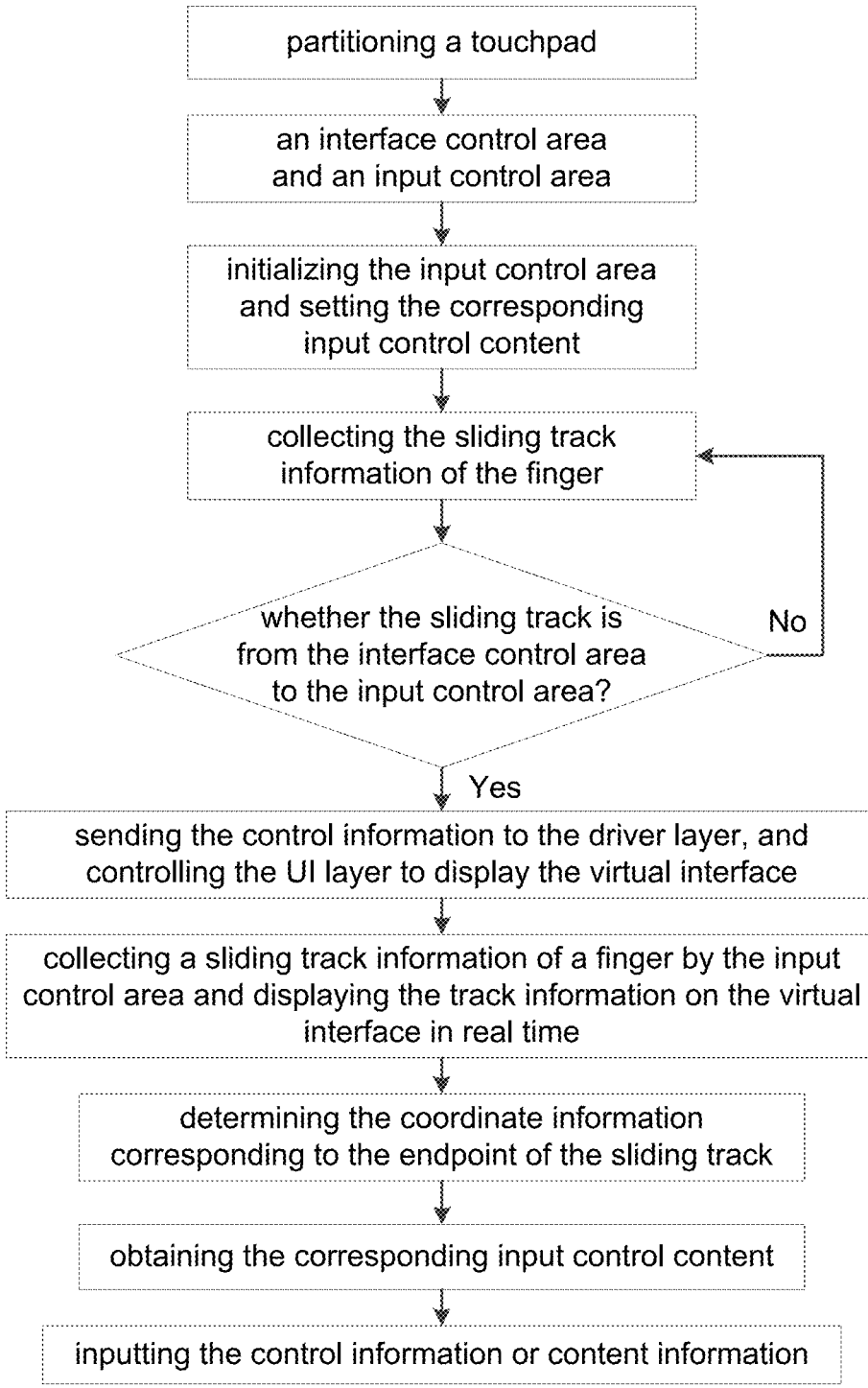
FIG. 17 is a flow chart of a method for the input control method based on a haptic-visual technology in an embodiment of the present disclosure.

An embodiment of the present disclosure: an input control method based on a haptic-visual technology, as shown in FIG. 17, comprises the steps of: partitioning and initializing a touchpad, dividing the touchpad into an interface control area and an input control area; controlling the UI layer to display a virtual interface according to the information collected by the interface control area and the input control area, and at the same time displaying the user's sliding operation on the touchpad on the virtual interface in real time according to the information collected by the input control area, and controlling the input content information or execution control information. The interface control area corresponds to the trigger area in the above embodiments, and the input control area corresponds to the invalid area in the above embodiments.

Wherein the step of partitioning and initializing the touchpad, dividing the touchpad into an interface control area and an input control area specifically comprises the steps of:

S11: determining the size of the touchpad and performing a coordinate definition on the touchpad;

S12: dividing the touchpad into an interface control area and an input control area by using the coordinate information, and further partitioning the input control area; wherein the interface control area is adjacent to the input control area are; the interface control area is provided on the left side, right side, upper side, lower side, upper left corner, lower left corner, upper right corner or lower right corner of the input control area;

S13: initializing the input control area and setting the corresponding input control contents.

The step of controlling the UI layer to display a virtual interface according to the information collected by the interface control area and the input control area specifically comprises: collecting the sliding track information of the finger by the driver layer; if the corresponding track information shows that the user's sliding operation is from the interface control area to the input control area, the UI layer is controlled to display the virtual interface.

The step of displaying the user's sliding operation on the touchpad on the virtual interface in real time according to the information collected by the input control area, and controlling the input content information or execution control information specifically comprises the steps of:

S21: collecting a sliding track information of a finger by the input control area and displaying the content corresponding to the coordinate information of the current sliding track on the virtual interface in real time;

S22: determining the coordinate information corresponding to the end point of the sliding track, and obtaining the corresponding input control content;

S23: inputting content information or executing control information according to the input control content.

In the above method, the touchpad is a touchpad embedded in a notebook computer or a single touchpad product.

The input control system based on a haptic-visual technology, comprises:

a touchpad partition and initialization circuit configured to partition and initialize the touchpad, and divide the touchpad into an interface control area and an input control area;

a virtual interface display control circuit configured to control the UI layer to display a virtual interface according to the information collected by the interface control area and the input control area;

a real-time display and control input circuit configured to display the user's sliding operation on the touchpad on the virtual interface in real time according to the information collected by the input control area, and control the input content information or execution control information.

Wherein, the touchpad partition and initialization circuit as shown specifically comprise:

a size determination and coordinate definition circuit configured to determine the size of the touchpad and perform the coordinate definition on the touchpad;

an area dividing circuit configured to divide the touchpad into an interface control area and an input control area by using the coordinate information, wherein the interface control area is adjacent to the input control area;

a setting and initialization circuit configured to initialize the input control area and set the corresponding input control contents.

The virtual interface display control circuit specifically comprises:

a finger sliding track information collecting circuit, configured to collect the sliding track information of the finger;

a virtual interface display circuit, configured to collect the sliding track information of the finger by the drive layer, and if the corresponding track information shows that the user's sliding operation is from the interface control area to the input control area, the UI layer is controlled to display the virtual interface.

The real-time display and control input circuit specifically comprises:

a finger sliding track collection and display circuit, configured to collect the sliding track information of the finger by the input control area and display the content corresponding to the coordinate information of the current sliding track on the virtual interface in real time;

an input control content acquisition circuit configured to determine the coordinate information corresponding to an end point of the sliding track and obtain the corresponding input control content;

an information input circuit configured to input content information or execute control information based on said input control content.

Any part not described in detail in the embodiments of the present disclosure may be implemented by using the prior art.

Figure 18:
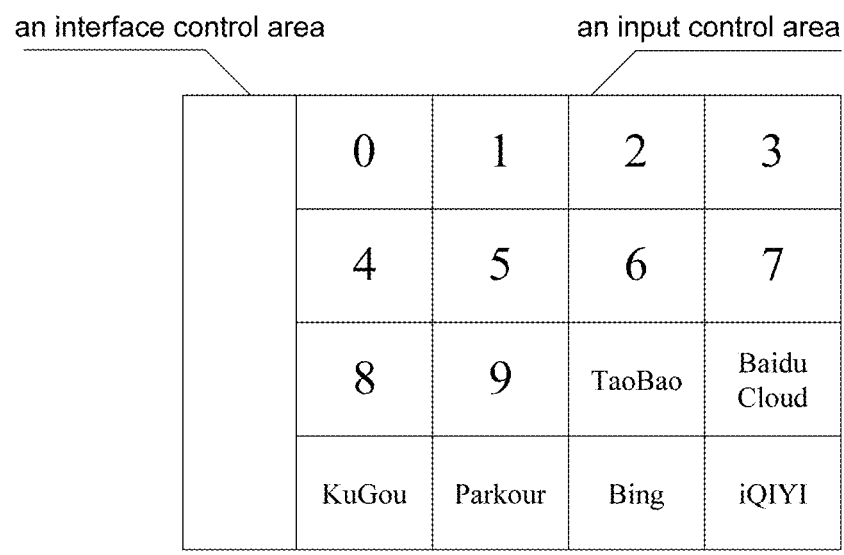
FIG. 18 is a schematic diagram of partitioning a touch-sensitive surface by an input control method based on a haptic-visual technology in an embodiment of the present disclosure.

The working principle of an embodiment of the present disclosure is that: first, the size of a touchpad (the touchpad is a touchpad embedded in a notebook computer or single touchpad product) is determined and coordinates of the touchpad are defined; the touchpad is divided into an interface control area and an input control area by using the coordinate information and the input control area is further partitioned (for example, divided into 4*4 partitions); wherein the interface control area is adjacent to the input control area; the interface control area may be provided on the left side, the right side, the upper side, the lower side, the upper left corner, the lower left corner, the upper right corner or the lower right corner of the input control area; it is assumed here that the interface control area is provided on the left side of the input control area (as shown in FIG. 18); second, the input control area is initialized and the corresponding input control content is set (such as the application software control information or digital content information as shown in FIG. 2).

If user A wants to open a Bing dictionary to search for a word when editing the word document, the user A only needs to slide the finger from left to right on the touchpad, the virtual interface can be displayed in the word document page and then the user continues to slide his/her finger to the "Bing" to take the finger off, and the Bing software can be opened while the virtual interface disappears. Specifically, the system is internally processed in this way: (Custom) the driver layer divides the touchpad into an interface control area and an input control area on the software level. The finger's sliding track information is collected by the driver layer. If the corresponding track information shows that the sliding operation of the user is from the interface control area to the input control area, the UI layer is controlled to display the virtual interface. The sliding track information of the finger is collected by the input control area and the content corresponding to the coordinate information of the current sliding track is displayed on the virtual interface in real time; and then the coordination information corresponding to the end point of the sliding track is determined (i.e., the position of the input control area 4*3) and the corresponding input control content is obtained (that is, controlled to open the Bing dictionary); control information is executed according to the input control content (i.e., opened the Bing dictionary), and the input control area sends the control information to the driver layer, after receiving the control information, the driver layer controls UI layer to hide the virtual interface.

In the present disclosure, the terms "first", "second", and "third" are only used for descriptive purposes and are not to be construed as indicating or implying relative importance. The term "a plurality of" refers to two or more, unless expressly defined otherwise.

The foregoing descriptions are merely preferred embodiments of the present disclosure and are not intended to limit the present disclosure. For those skilled in the art, the present disclosure may have various modifications and changes. Any modification, equivalent replacement, improvement and the like made within the spirit and principle of the present disclosure should be included in the protection scope of the present disclosure.

What is claimed is:

1. An input method based on a touch-sensitive surface of a touchpad to display, comprising the steps of:
    dividing the touch-sensitive surface into an interface control area and an input control area;
    collecting sliding track information of a touching object on the touch-sensitive surface by a driver layer;
    if the sliding track information shows that a sliding operation is from the interface control area to the input control area, controlling a User Interface layer to display a virtual interface according to information collected by the interface control area and the input control area, and at the same time displaying the sliding operation on the touch-sensitive surface on the virtual interface in real time according to the information collected by the input control area;
    acquiring a starting position and sliding position of the touching object on the touch-sensitive surface in real time;
    determining the starting point position falls within an inner edge region of the touch-sensitive surface and the sliding positions exceed the inner edge region and continue to slide inward the touch-sensitive surface;
    controlling the display to display a window containing at least one icon, which is customized;
    continuously acquiring the continuous sliding position information of the touching object in real time after the window containing the at least one icon is displayed;
    according to the continuously acquired continuous sliding position information of the touching object, positioning a selected location in the window in real time, and controlling the display to display a pointer or a selected content in the selected location;
    generating trigger event information according to the selected location when it is determined that the touching object leaves the touch-sensitive surface; and
    after generating the event information that triggers an entity associated with a selected icon, generating information for closing the window;
    wherein generating the trigger event information according to the selected location comprises: generating information for closing the window when it is determined that the selected location in the continuously acquired continuous sliding position information is in a cancellation area of the touch-sensitive surface when the touching object leaves the touch-sensitive surface; and
    wherein the cancellation area of the touch-sensitive surface is located at an edge of the touch-sensitive surface, and a width of the cancellation area is from 1% to 5% of a width or length of the touch-sensitive surface.

2. The input method according to claim 1, wherein controlling the display to display the pointer or the selected content in the selected location comprises: controlling the display to highlight a selected icon or a selected range of the selected icon when the selected location falls within the selected range of the selected icon in the window.

3. The input method according to claim 2, wherein controlling the display to display the pointer or the selected content in the selected location comprises: controlling the display to display a pointer at the selected location when the selected location falls outside the selected range of the selected icon in the window.

4. The input method according to claim 1, wherein generating the trigger event information according to the selected location comprises: generating event information that triggers an entity associated with a selected icon when the selected location falls within a selected range of the selected icon in the window.

5. The input method according to claim 4, wherein generating event information that triggers an entity associated with the icon comprises one or more of: a step of generating event information for opening an executable file, a step of generating event information for opening a file, a step of generating event information for opening a file folder, a step of generating event information for opening a website, and a step of generating event information for performing a macro definition.

6. The input method according to claim 1, wherein generating the trigger event information according to the selected location further comprises: generating information for closing the window when the selected location falls outside a selected range of a selected icon in the window.

7. The input method according to claim 1, wherein acquiring continuous sliding position information of a touching object on the touch-sensitive surface in real time comprises:
acquiring a touch state of the touch-sensitive surface in real time, and if the touch state of the touch-sensitive surface is being occupied all the time within a threshold time, a continuous position of the touching object is recorded and the continuous position of the touching object is taken as the continuous sliding position information of the touching object.

8. The input method according to claim 1, wherein determining the touching object leaves the touch-sensitive surface comprises: acquiring a touch state of the touch-sensitive surface in real time, if the touch state of the touch-sensitive surface is changed from being occupied to being unoccupied, determining that the touching object leaves the touch-sensitive surface.

9. The input method according to claim 1, wherein acquiring the slide positions comprises:
acquiring positions of a plurality of points of the touching object on the touch-sensitive surface;
calculating an average direction vector based on the positions of the plurality of points and the starting point position; and
taking the average direction vector as a sliding direction.

10. The input method according to claim 9, further comprising:
determining that an included angle between the sliding direction and a corresponding edge of the edge region is greater than a first threshold value.

11. The input method according to claim 1, wherein the inner edge region includes 5 mm inward from the corresponding edge of the touch-sensitive surface.

12. The input method according to claim 1, wherein determining that the continuous sliding position information conforms to the starting condition comprises:
acquiring a current location of the touching object after it is determined that the included angle is greater than the first threshold value, and acquiring a sliding distance according to the current location and the starting point position, and if the sliding distance is greater than a second threshold value, it is determined that the continuous sliding position information conforms to the starting condition.

13. The input method according to claim 1, wherein positioning the selected location in the window in real time comprises: acquiring current location information of the touching object, and acquiring the selected location according to the correspondence relationship between the size of the touch-sensitive surface and the size of the window.

14. The input method according to claim 1, wherein positioning the selected location in the window in real time comprises: acquiring the coordinate information of the touching object on the touch-sensitive surface, and acquiring a numerical value of the selected location in an X-axis direction in the window according to a proportional relationship between a length of the touch-sensitive surface and a length of the window and an X-directional value in the coordinate information; and acquiring a numerical value of the selected location in a Y-axis direction in the window according to a correspondence relationship between a width of the touch-sensitive surface and a width of the window and a Y-directional value in the coordinate information.

15. The input method according to claim 1, wherein before acquiring continuous sliding position information of a touching object on the touch-sensitive surface in real time, the method further comprising:
acquiring and saving the at least one icon and a mapping relationship between the at least one icon and at least one entity associated with the at least one icon.

16. An electronic device, comprising:
a display unit configured to display a user interface object;
a touch-sensitive surface unit configured to detect contact from a touching object and being divided into an interface control area and an input control area;
a driver layer configured to collect sliding track information of the touching object on the touch-sensitive surface, if the sliding track information shows that a sliding operation is from the interface control area to the input control area, control a User Interface layer to display a virtual interface according to information collected by the interface control area and the input control area, and at the same time display the sliding operation on the touch-sensitive surface on the virtual interface in real time according to the information collected by the input control area;
a processing unit coupled to the display unit and the touch-sensitive surface unit, wherein the processing unit is configured to acquire the continuous sliding position information on the touch-sensitive surface unit in real time, wherein the continuous sliding position information includes a starting point position and sliding positions of the touching object on the touch-sensitive surface unit; and
when it is determined that the starting point position falls within an inner edge region of the touch-sensitive surface and the sliding positions exceed the inner edge region and continue to slide inward the touch-sensitive surface, control the display unit to display a window containing at least one icon, which is customized;
continuously acquire the continuous sliding position information on the touch-sensitive surface unit in real time;
according to the continuously acquired continuous sliding position information, position a selected location in the window in real time and control the display unit to display a pointer or a selected content in the selected location, and generate trigger event information and perform a corresponding function according to the selected location when it is determined that the information that the touching object leaves the touch-sensitive surface is obtained by the touch-sensitive surface unit, and generate information for closing the window to a real-time display unit when it is determined that the touching object leaves the touch-sensitive surface unit, and the real-time display unit controls the closing of the window;
wherein after it is determined that the starting point position falls within the inner edge region of the touch-sensitive surface and the sliding positions exceed the inner edge region and continue to slide inward the touch-sensitive surface, the detection unit is further configured to generate information for closing the window when it is determined that the touching object is in a cancellation area of the touch-sensitive surface unit, and send the information for closing the window to the real-time display unit, and the real-time display unit controls the display unit to close the window; and the cancellation area of the touch-sensitive surface unit is located at an edge of the touch-sensitive surface unit and a width of the cancellation area is 1% to 5% of a width or length of the touch-sensitive surface unit.

17. The electronic device according to claim 16, wherein the processing unit comprises a detection unit coupled to the touch-sensitive surface unit; a real-time display unit connected to the detection unit; a feedback unit connected to the detecting unit and an execution unit; wherein the real-time display unit is further coupled to the display unit; the detection unit is configured to acquire the starting point position and the sliding positions of the touching object on the touch-sensitive surface unit in real time, generate activation information when it is determined that the starting point position falls within the inner edge region of the touch-sensitive surface and the sliding positions exceed the inner edge region and continue to slide inward the touch-sensitive surface, send the activation information to the real-time display unit, continuously acquire the continuous sliding position information and send the continuously acquired continuous sliding position information to the real-time display unit until it is determined that the touching object leaves the touch-sensitive surface, then send a current location of the touching object to the feedback unit; the real-time display unit is configured to control the display unit to display a window according to the activation information and generate the selected location according to the continuously acquired continuous sliding position information, and control the display unit to display the pointer or the selected content in the window according to the selected location; the feedback unit is configured to generate the trigger event information according to the current location of the touching object and send the trigger event information to the execution unit.

18. The electronic device according to claim 17, wherein the real-time display unit is configured to control, according to the selected location, the display unit to display the pointer or the selected content in the window; and the real-time display unit is configured to generate information for controlling the display unit to highlight a selected icon or a selected range of the selected icon when the selected location falls within the selected range of the selected icon in the window.

19. The electronic device according to claim 17, wherein the real-time display unit is configured to control, according to the selected location, the display unit to display the pointer or the selected content in the window; and the real-time display unit is further configured to generate information for controlling the display unit to display a pointer at the selected location when the selected location falls outside the selected range of the selected icon in the window.

20. The electronic device according to claim 17, wherein the feedback unit is configured to generate event information that triggers an entity associated with the selected icon when the current location of the touching object falls within a selected range of the selected icon in the window.

21. The electronic device according to claim 20, wherein the feedback unit is further configured to generate the information for closing the window after generating the event information that triggers the entity associated with the selected icon; or, the feedback unit is further configured to generate information for closing the window when the current location of the touching object falls outside the selected range of the selected icon in the window.

22. The electronic device according to claim 20, wherein the feedback unit is further configured to generate, according to the current location of the touching object, one or more of event information for opening an executable file, event information for opening a file, event information for opening a file folder, event information for opening a website, and event information for performing a macro definition.

23. The electronic device according to claim 17, wherein the detection unit is configured to obtain a touch state of the touch-sensitive surface unit in real time, and if the touch state of the touch-sensitive surface unit is being occupied all the time within the threshold time, a continuous position of the touching object is recorded, and the continuous position of the touching object is taken as the continuous sliding position information of the touching object.

24. The electronic device according to claim 17, wherein the step that the detection unit determines the touching object leaves the touch-sensitive surface unit comprises acquiring the touch state of the touch-sensitive surface unit in real time; and if the touch state of the touch-sensitive surface unit changes from being occupied to being unoccupied, it is determined that the touching object leaves the touch-sensitive surface unit.

25. The electronic device according to claim 17, wherein the step that the detecting unit acquires the sliding direction comprises: acquiring positions of a plurality of points of the touching object on the touch-sensitive surface unit, and calculating an average direction vector based on the positions of a plurality of points and the starting point position, and taking the average direction vector as the sliding direction; the detection unit is further configured to acquire the current location of the touching object after determining that the included angle is greater than the first threshold value, and acquire a sliding distance according to the current location and a starting point position, and determine the sliding distance is greater than a second threshold value before generating the activation information.

26. The electronic device according to claim 17, wherein the step of generating the selected location in the window by the real-time display unit comprises acquiring the current location information of the touching object, and acquiring a position of the pointer according to a correspondence relationship between a size of the touch-sensitive surface unit and a size of the window.

27. The electronic device according to claim 17, wherein the display unit comprises one or more of a computer display, a display screen of a mobile phone, and a display screen of a tablet; the touch-sensitive surface unit comprises one or more of a notebook touch panel, a touch screen of a mobile phone, and a touch screen of a tablet.

28. An input control method based on a haptic-visual technology, comprising the steps of:
  determining a size of a touchpad and performing a coordinate definition on the touchpad;
  dividing the touchpad into an interface control area and an input control area by using the coordinate definition, and further partitioning the input control area; wherein the interface control area is adjacent to the input control area; initializing the input control area and setting corresponding input control content;
  collecting sliding track information by a driver layer and receiving moving information of a touching object on the touchpad, wherein the moving information of the touching object includes a starting point position falling within an inner edge region of the touchpad and sliding positions exceed the inner edge region and continue to slide inward the touch-sensitive surface;

if the sliding track information shows that a sliding operation is from the interface control area to the input control area, controlling a User Interface (UI) layer to display a virtual interface, which is customized, according to the moving information collected in the interface control area and the input control area;

continuously receiving the moving information of a touching object on the touchpad;

displaying on the virtual interface, in real time, the continuously received moving information of the touching object on the touchpad;

controlling input content information or executing control information upon detecting that the touching object leaves the touchpad; and generating information for closing the virtual interface when it is determined that the continuously received moving information is in a cancellation area of the touchpad when the touching object leaves the touchpad; and wherein the cancellation area of the touchpad is located at an edge of the touchpad, and a width of the cancellation area is from 1% to 5% of a width or length of the touchpad.

29. The input control method based on a haptic-visual technology according to claim 28, wherein the interface control area is provided on the left side, the right side, the upper side, the lower side, upper left corner, lower left corner, upper right corner or lower right corner of the input control area.

30. The input control method based on a haptic-visual technology according to claim 28, wherein controlling the UI layer to display the virtual interface according to the moving information collected in the interface control area and the input control area comprises: if the corresponding moving information shows that the touching object is moved from the interface control area to the input control area, the UI layer is controlled to display the virtual interface.

31. The input control method based on a haptic-visual technology according to claim 28, wherein the step of displaying on the virtual interface, in real time, the continuously received moving information of the touching object on the touchpad, and controlling the input content information or executing control information upon detecting that the touching object leaves the touchpad comprises the steps of:

collecting the moving information of the touching object in the input control area and displaying on the virtual interface, in real time, a content corresponding to coordinate information of the moving information;

determining the coordinate information corresponding to the endpoint of the moving information, and obtaining the corresponding input control content; and inputting content information or executing control information according to the input control content.

32. The input control method based on a haptic-visual technology according to claim 28, wherein the touchpad is a touchpad embedded in a notebook computer or a single touchpad product.

33. An input control system based on a haptic-visual technology, comprising:

a touchpad partition and initialization circuit configured to partition and initialize a touchpad;

a touchpad receiving circuit configured to receive moving information of a touching object on the touchpad, wherein the moving information of the touching object includes a starting point position falling within an inner edge region of the touchpad and sliding positions exceed the inner edge region and continue to slide inward the touch-sensitive surface;

a size determination and coordinate definition circuit configured to determine a size of the touchpad and perform a coordinate definition on the touchpad;

an area dividing circuit configured to divide the touchpad into an interface control area and an input control area by using the coordinate definition, wherein the interface control area is adjacent to the input control area;

a setting and initialization circuit configured to initialize the input control area and set corresponding input control content;

a virtual interface display control circuit configured to control a User Interface (UI) layer to display a virtual interface, which is customized, according to the moving information received by the touchpad receiving circuit if the sliding track information shows that a sliding operation is from the interface control area to the input control area; and a real-time display and control input circuit configured to display on the virtual interface, in real time, a continuously received moving information of the touching object on the touchpad received by the touchpad receiving circuit, and control input content information or executing control information upon detecting that the touching object leaves the touchpad and close the virtual interface when it is determined that the continuously received moving information is in a cancellation area of the touchpad when the touching object leaves the touchpad; and wherein the cancellation area of the touchpad is located at an edge of the touchpad, and a width of the cancellation area is from 1% to 5% of a width or length of the touchpad.

34. The input control system based on a haptic-visual technology according to claim 33, wherein the virtual interface display control circuit comprises:

a virtual interface display circuit configured to control the UI layer to display the virtual interface, if the corresponding track information shows that the touching object is moved from the interface control area to the input control area.

35. The input control system based on a haptic-visual technology according to claim 33, wherein the real-time display and control input circuit comprises:

a display circuit configured to display a content corresponding to coordinate information of the continuously received moving information of the touch object on the virtual interface in real time;

an input control content acquisition circuit configured to determine the coordinate information corresponding to an endpoint of the moving information and obtain a corresponding input control content; and an information input circuit configured to input content information or execute control information based on the input control content.

* * * * *